United States Patent [19]

Hemmerich

[11] 4,406,130
[45] Sep. 27, 1983

[54] COLD SURFACE FOR CRYOGENIC PUMPS

[75] Inventor: Johann Hemmerich, Julich, Fed. Rep. of Germany

[73] Assignee: Kernforschungsanlage Julich GmbH, Julich, Fed. Rep. of Germany

[21] Appl. No.: 238,673

[22] Filed: Feb. 27, 1981

[30] Foreign Application Priority Data

Mar. 4, 1980 [DE] Fed. Rep. of Germany ....... 3008126

[51] Int. Cl.³ .............................................. B01D 8/00
[52] U.S. Cl. ....................................... 62/55.5; 55/269; 62/268; 165/171; 417/901
[58] Field of Search ......................... 62/55.5, 100, 268; 165/171; 55/269; 417/901

[56] References Cited

U.S. PATENT DOCUMENTS

| | | | |
|---|---|---|---|
| 1,723,659 | 8/1929 | Rosenqvist | 204/25 |
| 1,909,552 | 5/1933 | Rosenqvist | 204/16 |
| 2,024,521 | 12/1935 | Harrison | 204/8 |
| 2,091,584 | 8/1937 | Brown | 62/126 |
| 2,540,175 | 2/1951 | Rosenqvist | 204/9 |
| 2,804,284 | 8/1957 | Otten | 165/171 |
| 3,022,230 | 2/1962 | Fialkoff | 204/9 |
| 3,039,453 | 6/1962 | Andrassy | 165/171 |
| 3,273,636 | 9/1966 | Hickey et al. | 165/67 |
| 3,485,054 | 12/1969 | Hogan | 62/55.5 |
| 3,987,784 | 10/1976 | Godrick | 126/447 |
| 4,055,162 | 10/1977 | Gonzalez | 165/171 |

FOREIGN PATENT DOCUMENTS

| | | |
|---|---|---|
| 611581 | 4/1935 | Fed. Rep. of Germany . |
| 1350046 | 11/1962 | France . |
| 83707 | 3/1963 | France . |
| 7012320 | 12/1971 | France . |
| 7517359 | 6/1980 | France . |

OTHER PUBLICATIONS

Kuhne, H., German Publication Document K10580, Apr. 24, 1952.

*Primary Examiner*—Ronald C. Capossela
*Attorney, Agent, or Firm*—Scully, Scott, Murphy & Presser

[57] ABSTRACT

A cold surface for cryogenic pumps in the form of a (filled/through-streamed) double wall which is acted upon by a liquid refrigeration medium, as well as to a process for the production of such a cold surface. The double wall is formed by a series of thin-walled narrow tubes which are interconnected with each other, to which there are presently attached thin axially parallel, good heat conductive metal lamellas, wherein the tube diameter, tube spacing and wall thickness, as well as the lamella thickness, with consideration being given to a minimization of the total mass of the surface, are so correlated and dimensioned with respect to each other that the temperature differences within the lamellas of the surface which is acted upon with liquid refrigeration medium at a maximum occuring heat loading will remain below 0.1° K.

5 Claims, 5 Drawing Figures

COLD SURFACE FOR CRYOGENIC PUMPS

BACKGROUND OF THE INVENTION

1. Field of the Invention

The present invention relates to a cold surface for cryogenic pumps in the form of a (filled/through-streamed) double wall which is acted upon by a liquid refrigeration medium, as well as to a process for the production of such a cold surface. In particular, the invention relates to cold surfaces for cryogenic helium pumps.

2. Discussion of the Prior Art

Cold surfaces for cryogenic condensation or cryogenic absorption pumps have, for a long time, been produced in an ordinary course by proceeding from two superimposed planar sheet metal plates, which were interconnected by means of point or linearly-shaped roll seam welds. After circumferential vacuum-tight welding of the edges pursuant to usual methods, the space intermediate the sheet metal plates was subjected to pressure and in a relative manner inflated so as to produce a flat hollow body with a pattern of passageways in conformance with the purpose of utilization. This hollow body, during utilization as a refrigerating or cold surface, is filled with the refrigeration medium (liquid helium or nitrogen).

Such cold surfaces which, in the usual manner are constructed as double walls acted upon by a refrigeration medium, have a quite considerable weight in larger pumps (in a magnitude of about 10 kg/m$^2$) and fill volumes (typically about 5 to 10 liters/m$^2$), and thus require relatively large amounts of expensive refrigeration medium for filling and cooling whose use, based on reasons of economy, should be held as low as possible at an adequate cooling effect.

SUMMARY OF THE INVENTION

Accordingly, it is an object of the present invention to provide a cold surface whose usage of refrigeration medium is as low as possible and which further evidences a low thermal inertia and, in particular, also shows satisfactory behavior during intensive neutron radiation.

The inventive cold surface through which there is achieved this object is essentially characterized in that the double wall is formed by a series of thin-walled narrow tubes which are interconnected with each other, to which there are presently attached thin axially parallel, good heat conductive metal lamellas, wherein the tube diameter, tube spacing and wall thickness, as well as the lamella thickness, with consideration being given to a minimization of the total mass of the surface, are so correlated and dimensioned with respect to each other that the temperature differences within the lamellas of the surface which is acted upon with liquid refrigeration medium at maximum occuring heat loading will remain below 0.1° K.

This means that, pursuant to the invention, the especially helium-cooled cold surface of a cryogenic pump which has heretofore for lengthy period of time been constructed either of relatively compact formed aluminum members, or in the manner set forth hereinabove, effected through a point-welded inflated dual sheet metal with plate thicknesses of about 1 mm, dismembered into a series of thin tubes, whose heat receiving capacity was increased by good heat conductive lamellas attached thereto, which need not be necessarily combined into an enclosed surface.

The dimensioning of these tubes and lamellas should hereby be so selected, with consideration given to the set limits of stability and heat conductivities of the materials, that the cold surface incorporates as little material as possible and the (liquid) helium throughput to the incident heat load can be correlated by gas which is to be pumped, or the thermal loads such as radiations, in particular, intensive neutron radiation.

Accordingly, the diameter of the tubes preferably lies within the range of about between 3 and 8 mm, the tube spacing between about 15 to 50 mm, the wall thickness of the tubes in the region of 0.1 to 0.5 mm, and the lamella thickness at about 0.05 to 0.5 mm. Typically, for heat loading on the surface of about 0.5 watt/m$^2$, there can be provided tubes having a diameter of 6 mm and a wall thickness of 0.1 mm, with a spacing of 40 mm and a lamella thickness of about 50 to 100 um.

Hereby consideration should be given to the type of heat loading, which means that for an intensive neutron radiation, the cold surface should be optimized with respect to a smallest possible fill volume.

Preferably, the narrow tubes are each connected to each other through a distributor conduit and collector conduit, and the metal lamellas especially form connecting webs between parallel tubes so as to produce a coherent (possibly also apertured) surface which, when incorporated into the pump construction, can be suspended on a carrier or fastened thereto.

The inventively provided narrow tubes in contrast with the known inflated hollow bodies, can be relatively thin-walled so as to provide material savings in a magnitude to the extent of at least 90%. The material saving is equally significant with a reduction in the heat capacity of the entire cold surface, whereby the thermal inertia is low and, particularly, the refrigeration medium usage as repeated interim heating (for instance, for condensate removal) is significantly reduced without, however, influencing the cooling effect of the wall.

In addition to this reduction in the energy requirement for the cooling and filling of the cold surface there is also obtained a further advantage for the utilization in (n,γ) radiation fields, particularly from its relatively low fill volume, through the reduction in the heating effect of the radiation since the energy input in the radiation field proportional to the total mass is correspondingly lower, and thus also less refrigeration power is required for the removal of the absorbed radiation energy.

The metal lamellas which are provided for the improvement of the heat exchange at a reduced fill volume, which are surface-like connected with the refrigeration medium tubes for an increase in the surface area, need not be necessarily provided as connecting surfaces between the tubes as long as it is possible to achieve a possible surface-like consolidation of the tubes in another manner. Preferably, however, these metal lamella form intermediate surfaces between the tubes so that in its entirety the cold surface is built from, for example, an about 50 um thick metal membrane with introduced or inserted tubes.

The tubes, in accordance with the flow resistance, can be arranged meander-shaped in the surface, or can also form a series of "harplike" adjacent located parallel tubes, which are interconnected through distributor conduits and collector conduits.

BRIEF DESCRIPTION OF THE DRAWINGS

The construction of such refrigeration or cold surfaces is suitably effected pursuant to a galvanic process in which there are given different possibilities, as illustrated in the accompanying drawings; in which.

DETAILED DESCRIPTION

Figure 1:
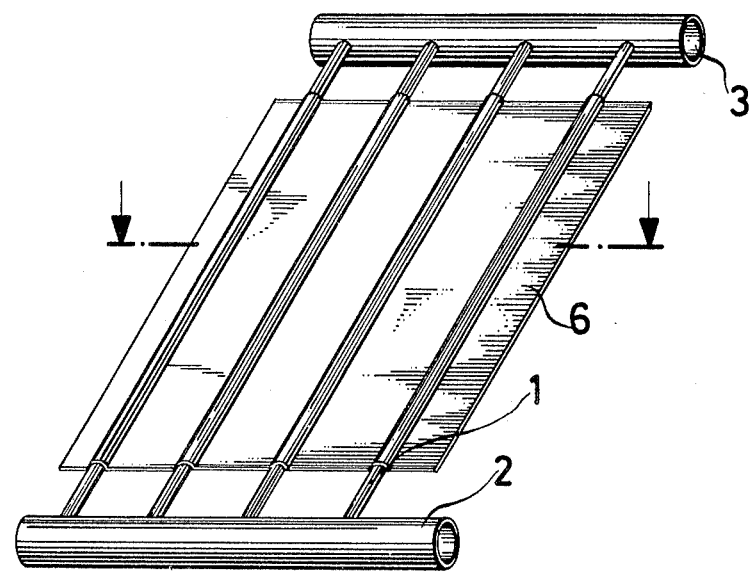
FIGS. 1 through 5 show the result of different process steps in the manufacture of the refrigeration or cold surfaces.
Figure 2:
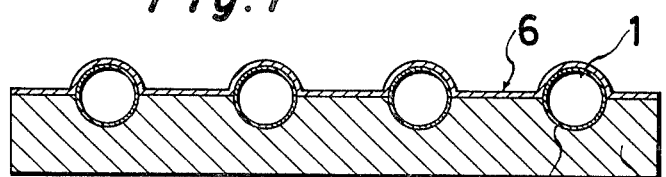

In the embodiment of the process illustrated in FIGS. 1 and 2 of the drawing, a harplike construction of mutually parallel thin wall tubes 1 of small diameter, which are presently vacuum-tightly brazed or welded at both ends into respective collector tubes 2 and 3 (for the inlet and outlet of cooling medium), is arranged on an electrically conductive substrate 4, which is provided with respective grooves 5 for the receipt of the tubes. Onto this arrangement there is applied in a galvanic mode a good heat-conductive layer 6 (for example, of copper) which is formed as an enclosed surface. The conductive substrate 4 finally is again removed.

Such a refrigeration or cold surface, for example, can consist of 4 mm diameter tubes with 0.1 mm wall thickness, which are arranged at a spacing of 20 mm and are held together through a galvanic layer of about 50 um. Such a cold surface has a mass of about 1 kg/m$^2$ and a fill volume of about 600 ml/m$^2$.

Figure 3:
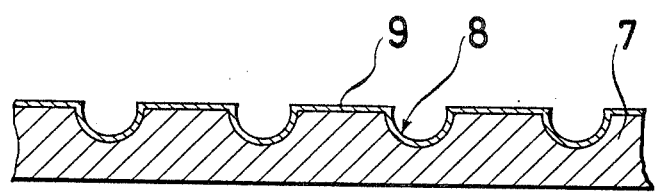
Figure 4:
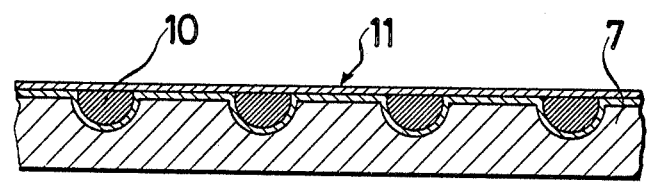

The embodiment of the process illustrated in FIGS. 3 and 4, causes to have in an electrically conductive substrate 7 to have engraved therein a desired pattern of passageways 8. The entire surface, inclusive of the passageways, is then provided with an enclosed vacuum-tight layer 9 of galvanically applied metal (in particular copper). The passageways which are clad with the first galvanic layer are thereafter filled with electrically-conductive compound 10 having a low melting point, and the entire arrangement again vacuum-tightly coated with a second galvanic layer 11, and the filler compound 10 is then molten out. Finally, the electrically-conductive substrate 7 is removed. As a connection for the thus formed structure, there are provided elements acting as distributors in the substrate, and during the application of the first galvanic layer are integrated into the structure.

In this manner there is obtained a refrigerating or cold surface with similar mass and similar fill volume as is with the embodiment of the first process.

Figure 5:
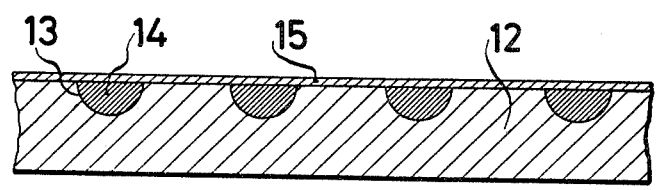

When the cold surface in its entirety assumes a mechanical function and, for example, should assume in the form of a hollow body an internal or external pressure, then the electrically-conductive substrate which is provided in the previously described process embodiments can be utilized as a support structure and provided as a mechanical member, and will then not be removed. In this instance, there can thus be eliminated the deposit of a first galvanic layer in the second embodiment and one can simply, as illustrated in FIG. 5, provide passageways 13 through engraving or etching in an electrically-conductive body 12, whose mass and configuration is determined somewhat through the mechanical forces acting thereon, or other conditions predicated upon the present purpose of utilization (for example, in a sheet metal plate of measured strength), wherein the passageways 13 are filled with an electrically-conductive low melting compound 14, upon which there is then applied a galvanic layer 15. Finally, the filler compound 14 is removed through melting.

A cold surface of the last described shape with supporting substrate requires a larger quantitiy of cooling medium for the cooling, however, due to its extremely low fill volume during operation with liquid helium in a neutron radiation field, there is achieved a reduced radiation energy input similarly satisfactory as that in the first and second embodiments (since the energy transmission from the neutrons to other atoms through elastic shocks becomes so much more appreciable, the lower the atomic weight, and thus becomes particularly unfavourable for helium).

The above described processes are not limited to the production of planar refrigeration or cold surfaces. Insofar as mechanical or galvanic processes methods allow for the foregoing, there can be produced cold surfaces of suitable configuration for correlation with the current purpose of application, for example, with folds for an increase of the surface, or cylindrically-shaped configurations (for example, wherein in an embodiment pursuant to FIG. 3 the sheet metal 12 is constructed cylindrically instead of planar). Through this free configurating there is obtained the possibility of an optimization of the pump output at predetermined boundary conditions (for example, the shape of the vacuum chamber, configuration and size of suction cross-sections, and so forth.

What is claimed is:

1. Cold surface for cryogenic pumps comprising a double wall structure acted upon by a liquid refrigeration medium, such as liquid helium, said double wall including a series of thin-walled, narrow, tubes interconnected through distributor conducts and collector conduits for said liquid refrigeration medium and arranged in parallel; and thin, axially parallel metal lamellas having good heat conductivity being attached to said tubes, wherein the tube diameter is in the range of between about 3 mm and 8 mm, the tube spacing is between about 15 mm and 50 mm, the tube wall thickness is in the range of about 0.1 mm to 0.5 mm, and the lamella thickness is between about 0.05 mm to 0.5 mm for effecting a minimization of the overall mass of the surface and for effecting temperature differentials within the lamella of the surface filled or passed by the liquid refrigeration medium remain, at maximum occurring heat load, below 0.1° K.

2. Cold surface as claimed in claim 1, said metal lamellas attached to said tubes forming connecting wells between said tubes.

3. Cold surface as claimed in claim 2, wherein said tubes and said connecting webs comprise galvanically separated layers.

4. Cold surface as claimed in claim 1, wherein said metal lamellas are a galvanically separated layer on the entire surface of at least one side of said double wall.

5. Cold surface as claimed in claim 1, which further comprises an electrically conductive supporting substrate and wherein said tubes are grooves in said substrate having a vacuum-tight galvanic coating covering.

* * * * *